(12) United States Patent
Merler et al.

(10) Patent No.: US 10,102,454 B2
(45) Date of Patent: Oct. 16, 2018

(54) IMAGE CLASSIFICATION UTILIZING SEMANTIC RELATIONSHIPS IN A CLASSIFICATION HIERARCHY

(71) Applicant: International Business Machines Corporation, Armonk, NY (US)

(72) Inventors: Michele Merler, New York, NY (US); John R. Smith, New York, NY (US); Rosario A. Uceda-Sosa, Hartsdale, NY (US); Hui Wu, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/813,401

(22) Filed: Nov. 15, 2017

(65) Prior Publication Data

US 2018/0089543 A1 Mar. 29, 2018

Related U.S. Application Data

(63) Continuation of application No. 15/273,872, filed on Sep. 23, 2016.

(51) Int. Cl.
*G06K 9/00* (2006.01)
*G06K 9/66* (2006.01)
*G06K 9/62* (2006.01)

(52) U.S. Cl.
CPC ............... *G06K 9/66* (2013.01); *G06K 9/628* (2013.01); *G06K 9/6277* (2013.01); *G06K 9/6285* (2013.01); *H05K 999/99* (2013.01); *G06K 9/627* (2013.01)

(58) Field of Classification Search
None
See application file for complete search history.

(56) References Cited

U.S. PATENT DOCUMENTS

| 8,391,618 | B1 | 3/2013 | Chuang et al. |
| 9,158,965 | B2 | 10/2015 | Li et al. |
| 2014/0086497 | A1 | 3/2014 | Fei-Fei et al. |
| 2015/0063713 | A1 | 3/2015 | Yang et al. |

OTHER PUBLICATIONS

L. Bossard et al., "Food-101—Mining Discriminative Components with Random Forests," 13th European Conference on Computer Vision (ECCV), Lecture Notes in Computer Science, Sep. 2014, pp. 446-461, vol. 8694, Zurich, Switzerland.

Y. Lin et al., "Large-Scale Image Classification: Fast Feature Extraction and SVM Training," IEEE Conference on Computer Vision and Pattern Recognition (CVPR), Jun. 2011, pp. 1689-1696.

(Continued)

*Primary Examiner* — Atiba O Fitzpatrick
(74) *Attorney, Agent, or Firm* — Rahan Oddin; Ryan, Mason & Lewis, LLP

(57) ABSTRACT

A method includes utilizing two or more classifiers to calculate, for an input image, probability scores for a plurality of classes based on visual information extracted from the input image and semantic relationships in a classification hierarchy, wherein each of the two or more classifiers is associated with a given one of two or more levels in the classification hierarchy with each level in the classification hierarchy comprising a subset of the plurality of classes, and classifying the input image based on the calculated probability scores.

20 Claims, 11 Drawing Sheets

(56) References Cited

OTHER PUBLICATIONS

A. Krizhevsky et al., "ImageNet Classification with Deep Convolutional Neural Networks," Advances in Neural Information Processing Systems (NIPS), Dec. 2012, pp. 1106-1114, vol. 25.
K. Simonyan et al., "Very Deep Convolutional Networks for Large-Scale Image Recognition," arXiv:1409.1556v6, Apr. 2015, 14 pages.
C. Szegedy et al., "Going Deeper with Convolutions," IEEE Conference on Computer Vision and Pattern Recognition (CVPR), Jun. 2015, 9 pages.
K. He et al., "Deep Residual Learning for Image Recognition," arXiv:1512.03385v1, Dec. 2015, 12 pages.
N. Görnitz et al., "Hierarchical Multitask Structured Output Learning for Large-Scale Sequence Segmentation," Advances in Neural Information Processing Systems (NIPS), Dec. 2011, pp. 2690-2698, vol. 24.
T. Deselaers et al., "Visual and Semantic Similarity in ImageNet," IEEE Conference on Computer Vision and Pattern Recognition (CVPR), Jun. 2011, pp. 1777-1784.
J. Deng et al., "Large-Scale Object Classification Using Label Relation Graphs," European Conference on Computer Vision (ECCV), Sep. 2014, pp. 48-64.
S. Xie et al., "Hyper-Class Augmented and Regularized Deep Learning for Fine-Grained Image Classification," IEEE Conference on Computer Vision and Pattern Recognition (CVPR), Jun. 2015, pp. 2645-2654.
M. Ristin et al., "From Categories to Subcategories: Large-Scale Image Classification with Partial Class Label Refinement," IEEE Conference on Computer Vision and Pattern Recognition (CVPR), Jun. 2015, pp. 231-239.
A. Frome et al., "DeViSE: A Deep Visual-Semantic Embedding Model," Advances in Neural Information Processing Systems (NIPS), Dec. 2013, pp. 2121-2129.
Z. Yan et al., HD-CNN: Hierarchical Deep Convolutional Neural Network for Large Scale Visual Recognition, arXiv:1410.0736v4, May 2015, pp. 4321-4329.
X. Zhang et al., "Embedding Label Structures for Fine-Grained Feature Representation," arXiv:1512.02895v2, Mar. 2016, 10 pages.
F. Zhou et al., "Fine-Grained Image Classification by Exploring Bipartite-Graph Labels," arXiv:1512.02665v2, Dec. 2015, 16 pages.
W.H. Hsu et al., "Video Search Reranking Through Random Walk Over Document-Level Context Graph," 15th ACM International Conference on Multimedia (MM), Sep. 2007, pp. 971-980, Augsburg, Bavaria, Germany.
O. Beijbom et al., "Menu-Match: Restaurant-Specific Food Logging from Images," IEEE Winter Conference on Applications of Computer Vision (WACV), Jan. 2015, pp. 844-851, Waikoloa, Hawaii.
V. Bettadapura et al., "Leveraging Context to Support Automated Food Recognition in Restaurants," IEEE Winter Conference on Applications of Computer Vision (WACV), Jan. 2015, pp. 580-587, Waikoloa, Hawaii.
Z.Y. Ge et al., "Modelling Local Deep Convolutional Neural Network Features to Improve Fine-Grained Image Classification," IEEE International Conference on Image Processing (ICIP), Sep. 2015, pp. 4112-4116.
J. Hessel et al., "Image Representations and New Domains in Neural Image Captioning," Fourth Workshop on Vision and Language (VL), Sep. 2015, pp. 29-39, Lisbon, Portugal.
H. Kagaya et al., "Food Detection and Recognition Using Convolutional Neural Network," 22nd ACM International Conference on Multimedia (MM), Nov. 2014, pp. 1085-1088.
Y. Kawano et al., "FoodCam: A Real-Time Mobile Food Recognition System Employing Fisher Vector," 20th Anniversary International Conference on MultiMedia Modeling (MMM), Part II, Lecture Notes in Computer Science, Jan. 2014, pp. 369-373, vol. 8326, Dublin, Ireland.
A.N. Langville et al., "A Survey of Eigenvector Methods for Web Information Retrieval," SIAM Review, Mar. 2005, pp. 135-161, vol. 47, No. 1.
A. Myers et al., "Im2Calories: Towards an Automated Mobile Vision Food Diary," IEEE International Conference on Computer Vision (ICCV), Dec. 2015, pp. 1233-1241, Santiago, Chile.
N. Martinel et al., "A Structured Committee for Food Recognition," IEEE International Conference on Computer Vision (ICCV), Dec. 2015, pp. 92-100.
Laurens Van Der Maaten, "Accelerating t-SNE Using Tree-Based Algorithms," Journal of Machine Learning Research, Jan. 2014, pp. 3221-3245, vol. 15, No. 1.
R. Xu et al., "Geolocalized Modeling for Dish Recognition," IEEE Transactions on Multimedia, Aug. 2015, pp. 1187-1199, vol. 17, No. 8.
K. Yanai et al., "Food Image Recognition Using Deep Convolutional Network with Pre-Training and Fine Tuning," IEEE International Conference on Multimedia & Expo Workshops (ICMEW), Jun.-Jul. 2015, 6 pages, Turin, Italy.
T. Zeng et al., "Deep Convolutional Neural Networks for Multi-Instance Multi-Task Learning," IEEE International Conference on Data Mining (ICDM), Nov. 2015, pp. 579-588.
List of IBM Patents or Patent Applications Treated as Related.

200

300

300

500

600

700

IMAGE CLASSIFICATION UTILIZING SEMANTIC RELATIONSHIPS IN A CLASSIFICATION HIERARCHY

BACKGROUND

The present application relates to visual recognition, and more specifically, to classifying images. Automatic visual recognition or image classification systems provide a number of advantages relative to manual labeling, which may have higher costs and be less efficient and harder to scale. Manual labeling may also require the use of expert knowledge to annotate images.

SUMMARY

Embodiments of the invention provide techniques for image classification that utilize semantic relationships in a classification hierarchy.

For example, in one embodiment, a computer-implemented method comprises utilizing two or more classifiers to calculate, for an input image, probability scores for a plurality of classes based on visual information extracted from the input image and semantic relationships in a classification hierarchy, wherein each of the two or more classifiers is associated with a given one of two or more levels in the classification hierarchy with each level in the classification hierarchy comprising a subset of the plurality of classes, and classifying the input image based on the calculated probability scores.

These and other illustrative embodiments include, without limitation, methods, apparatus, systems and computer-readable storage media.

DETAILED DESCRIPTION

Illustrative embodiments of the invention may be described herein in the context of illustrative methods, systems and devices for image classification utilizing semantic relationships in a classification hierarchy. However, it is to be understood that embodiments of the invention are not limited to the illustrative methods, systems and devices but instead are more broadly applicable to other suitable methods, systems and devices.

Automatic visual recognition has many application domains including but not limited to facial recognition, image-based meal nutrition assessment, pedestrian detection in self-driving cars, automatic product search and ordering, human-robot integration, industrial part recognition, etc. Illustrative embodiments provide a visual recognition framework or system that integrates inherent semantic relationships among fine-grained classes, thus providing for semantic-aware image classification.

Figure 1:
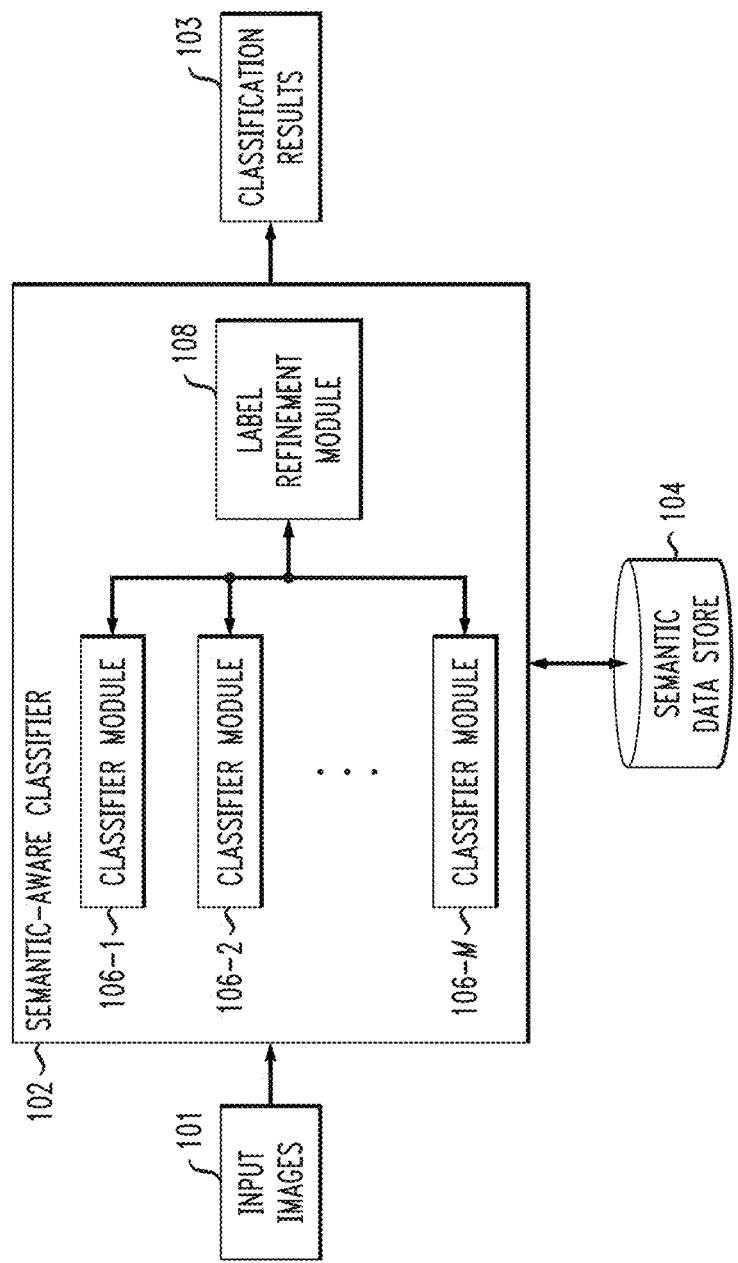
FIG. 1 depicts a system for semantic-aware image classification, according to an embodiment of the present invention.

FIG. 1 shows a visual recognition system 100, including a semantic-aware classifier 102. The semantic-aware classifier 102 is coupled to semantic data store 104, and is configured to receive input images 101 and provide classification results 103 for the input images 101. The semantic-aware classifier 102 includes classifier modules 106-1, 106-2, ... 106-M, collectively referred to herein as classifier modules or classifiers 106. The semantic-aware classifier 102 also include label refinement module 108.

The semantic-aware classifier 102 is configured to train the classifiers 106, which are configured to calculate probability scores for respective subsets of a plurality of classes. Different ones of the classifiers 106 are associated with different levels in a classification hierarchy. For example, classifier 106-1 may be associated with a first level of a classification hierarchy that has a number of different image classes, or a first subset of the plurality of classes. The classifier 106-1 is configured to calculate probability scores for the different image classes in the first level of the classification hierarchy. Classifier 106-2 may be associated with a second level of the classification hierarchy that also has a number of different image classes, or a second subset of the plurality of classes. The image classes in the second level of the classification hierarchy are more fine-grained relative to the image classes in the first level of the classification hierarchy. For example, the first level of the hierarchy may include classes such as snack foods, seafood or shellfish, etc. while the second level of the hierarchy may include classes such as spring rolls, nachos, cheese plate, etc. (e.g., subcategories of snack foods) and sushi, scallops, sashimi, oysters, etc. (e.g., subcategories of seafood or shellfish).

The classifiers 106 are trained such that they generate classification probabilities given a set of visual features of an image. The label refinement module 108 is configured to perform label inference so as to refine the classification probabilities of the classifiers 106 based on semantic relationships in the classification hierarchy, as will be described in further detail below.

The semantic-aware classifier 102 is configured to utilize the classifiers 106 to calculate probability scores for the input images 101 based on visual information that is extracted from the input images 101 and the semantic relationships in the classification hierarchy as the semantic relationships are embedded into the classifiers 106 during the label inference performed by the label refinement module 108. Based on the calculated probability scores, the input images 101 are classified and the semantic-aware classifier 102 generates the classification results 103.

Semantic data store 104 may be a source of the training data, the classification hierarchy or information that is utilized so as to generate the classification hierarchy. While FIG. 1 shows a system 100 wherein the semantic data store 104 is separate from the semantic-aware classifier 102, embodiments are not so limited. The semantic data store 104, which may be the source of a semantic structure or other information utilized in generating a semantic structure or classification hierarchy, may be incorporated in or otherwise be part of the semantic-aware classifier 102.

Although not explicitly shown in FIG. 1, the semantic-aware classifier 102 may be connected or operatively coupled to various other systems or devices that are the source of input images 101 or the destination for classification results 103. In some embodiments, the source of input images 101 and the destination for classification results 103 are the same. For example, a mobile device such as a smartphone may be the source of input images 101 and the destination for classification results 103. The visual recognition system 100 itself may be implemented on such a mobile device or otherwise be part of a computing node, cloud computing environment or other processing platform as will be discussed in further detail below with respect to FIGS. 8-10.

The semantic-aware classifier 102 provides a visual recognition framework that integrates inherent semantic relationships among fine-grained classes. In some embodiments, the semantic-aware classifier 102 learns semantic-aware features by formulating a multi-task loss function on top of a convolutional neural network (CNN) architecture or other deep learning neural network or machine learning architecture. The semantic-aware classifier 102 refines the CNN predictions using a random walk based smoothing procedure that further exploits the rich semantic information. In addition to improving classification accuracy, the semantic-aware classifier 102 can also provide more semantically meaningful classification results even in cases of incorrect predictions.

Various embodiments will be described herein in the context of an illustrative use case of food recognition. It is important to note, however, that embodiments are not limited to use in food recognition but instead are more generally applicable to other types and use cases for visual recognition as described herein.

Food recognition is one application domain for visual recognition. Pictures of food, both generic and highly specific, are widespread on the web and in social media. As fitness applications and other health applications grow in popularity, there is a need for easy logging of calorie consumption or other nutritional information on mobile devices. Food recognition engines are a fundamental building block for such fitness or other nutrition assessment applications including in automatic nutrition intake tracking. It would be desirable to provide a food recognition engine as part of such an application on a mobile device such as a smartphone, such that the user can take pictures of food dishes for automatic nutrition intake tracking or other uses such as meal planning, recognition of recipes for generation of shopping lists to create food dishes, etc.

Approaches for food recognition frameworks may model food recognition as a fine-grained classification problem and may utilize techniques such as random forests, structure support vector machines (SVMs) on extreme learning machines, directly training or fine-tuning deep CNN from food images and other image captioning techniques, etc. When geolocation of a picture is available, the scope of the problem may be reduced from recognition of food "in the wild" to matching items on the menu of a particular restaurant to enhance recognition performance. Treating food recognition as a flat fine-grained classification, problem, however, may disregard the rich semantic relationships among food classes.

A flat classifier receives input images and provides classification results. The flat classifier estimates the classification score on each class. No information about the relationships among the classes is utilized. The classification results may be in the form of numerical scores for each class, with the classification result being the class with the highest score. Training data, such as known image and class label pairs, may be used to train the flat classifier. In a similar manner, classifiers 106 in semantic-aware classifier 102 may be trained using training data comprising known image and class label pairs.

Flat classifiers treat all mistakes or incorrect classifications equally. Even when a food recognition or other visual recognition engine fails to identify the exact class for an input image, it may be useful or preferable if the visual recognition engine were to provide results consistent with the ground truth at a coarser category level. In other words, it may be useful for the visual recognition system to make "better" mistakes.

Figure 2:
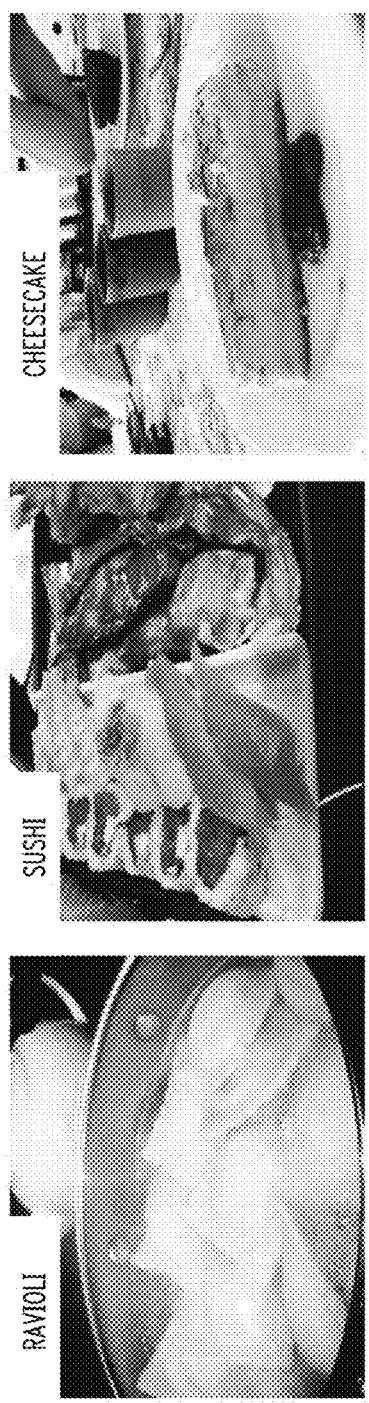
FIG. 2 depicts a comparison of image classification results using a flat classifier and a semantic-aware classifier, according to an embodiment of the present invention.

FIG. 2 illustrates examples of misclassification using both the semantic-aware classifier 102 with comparison to a flat classifier. FIG. 2 shows three images of ravioli, sushi and cheesecake respectively. The flat classifier and semantic-aware classifier 102 each incorrectly identifies these images, although as shown the semantic-aware classifier 102 makes "better" mistakes in that the incorrect classification results are at least semantically consistent with a coarser category of food dish in the classification hierarchy 300 shown in FIG. 3. For the ravioli image, the flat classifier provides a result of apple pie while the semantic-aware classifier 102 provides a result of dumplings—which is more semantically consistent with the ground truth of ravioli as both ravioli and dumplings fall within the same coarse category of dumpling dishes in classification hierarchy 300 while apple pie is in a different coarse category of pie in the classification hierarchy 300.

Similarly, while the flat classifier and semantic-aware classifier 102 each incorrectly classify the sushi image, the result provided by the semantic-aware classifier 102 (e.g., sashimi) is more semantically consistent with the ground truth than the result provided by the flat classifier (e.g., chicken wings) as sushi and sashimi are in the same coarse category of seafood or shellfish in the classification hierarchy 300 while chicken wings are in a different coarse category of chicken dish in the classification hierarchy 300. As another example, while flat classifier and semantic-aware classifier 102 each incorrectly classifies the cheesecake image, the result provided by the semantic-aware classifier 102 (e.g., carrot cake) is more semantically consistent with the ground truth than the result provided by the flat classifier (e.g., steak) as cheesecake and carrot cake are in the same coarse category of cake in the classification hierarchy 300 while steak is in a different coarse category of meat or poultry dish in the classification hierarchy 300.

The semantic-aware classifier 102 therefore provides improvements relative to flat classifiers, both in providing correct classification and providing more meaningful results in the event of incorrect classification. The semantic-aware classifier 102 in some embodiments utilizes a deep CNN-based recognition framework that is aware of the semantic structured relationships among classes in a classification hierarchy.

In some embodiments, multi-task learning is used to optimize or improve the structured output such as the hierarchical classification described herein. Label structures are encoded in the CNN. Label structures within CNNs can be modeled as dedicated fully connected layers that feed one another (e.g., from coarse to grain) and in graphs that link fine-grained classes to auxiliary categories encompassing label or attribute relations. Feature representations in some cases may be learned by jointly optimizing fine-grained classification and hierarchical similarity constraints. While modeling with fully connected layers, linking fine-grained classes to auxiliary categories and jointly optimizing fine-grained classification and hierarchical similarity constraints may provide for "deep" learning, such techniques may be limited to "shallow" semantic hierarchies (e.g., such techniques may only utilize two-level hierarchies). Moreover, such techniques may require explicit modeling of semantic links between each pair of coarse and fine classes, for example, using triplet loss or hierarchical weight regularization which require a very large amount of training examples and increases optimization complexity.

In some embodiments, the semantic-aware classifier 102 can easily generalize to an arbitrary number of levels in a hierarchical tree or other classification hierarchy without demanding or requiring substantial increases in the number of training examples. Thus, the semantic-aware classifier 102 provides a flexible multi-task loss function that jointly learns features across different semantic levels and may be easily integrated with different CNN or other machine learning or neural network designs. The semantic-aware classifier 102 also utilizes a random walk based label refinement strategy that takes advantage of the semantic structure in a classification hierarchy to improve consistent predictions at each semantic level.

More generally, the semantic-aware classifier 102 can incorporate a semantic tree or other classification hierarchy into a machine learning algorithm or network, including but not limited to a deep learning neural network or architecture such as a CNN architecture. Thus, the semantic-aware classifier 102 is able to advantageously optimize or improve the machine learning algorithm or network to obtain the best or improved classification at each level of the classification hierarchy while also explicitly performing label inference in the classification hierarchy to refine classification probability scores for each node or class in the classification hierarchy. As a result, recognition accuracy is improved utilizing semantic-aware classifier 102 and the semantic-aware classifier 102 can make "better" mistakes relative to flat classifiers as discussed above with respect to FIG. 2.

Figure 3:
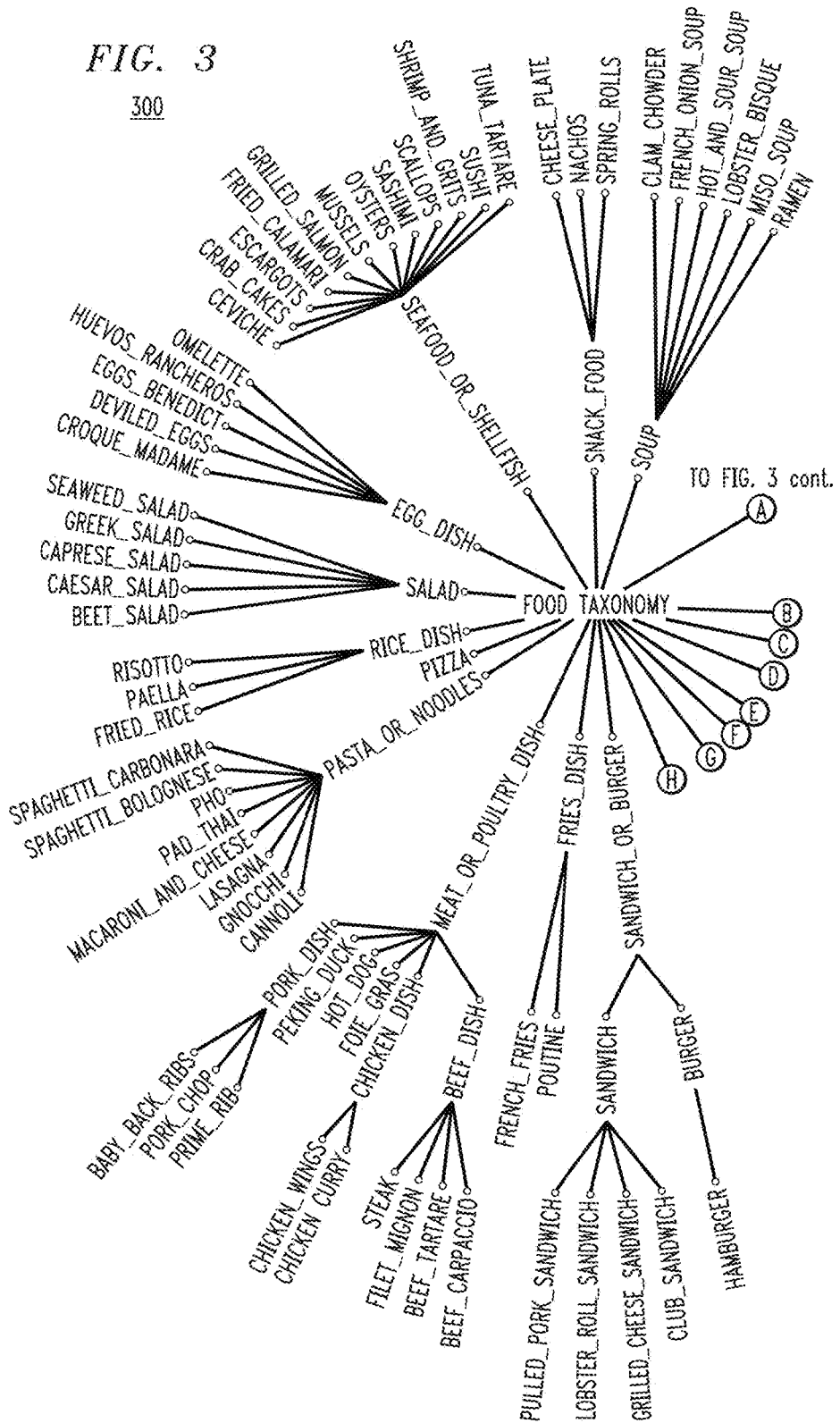
FIG. 3 depicts an example of a semantic structure, according to an embodiment of the present invention.
Figure 3:
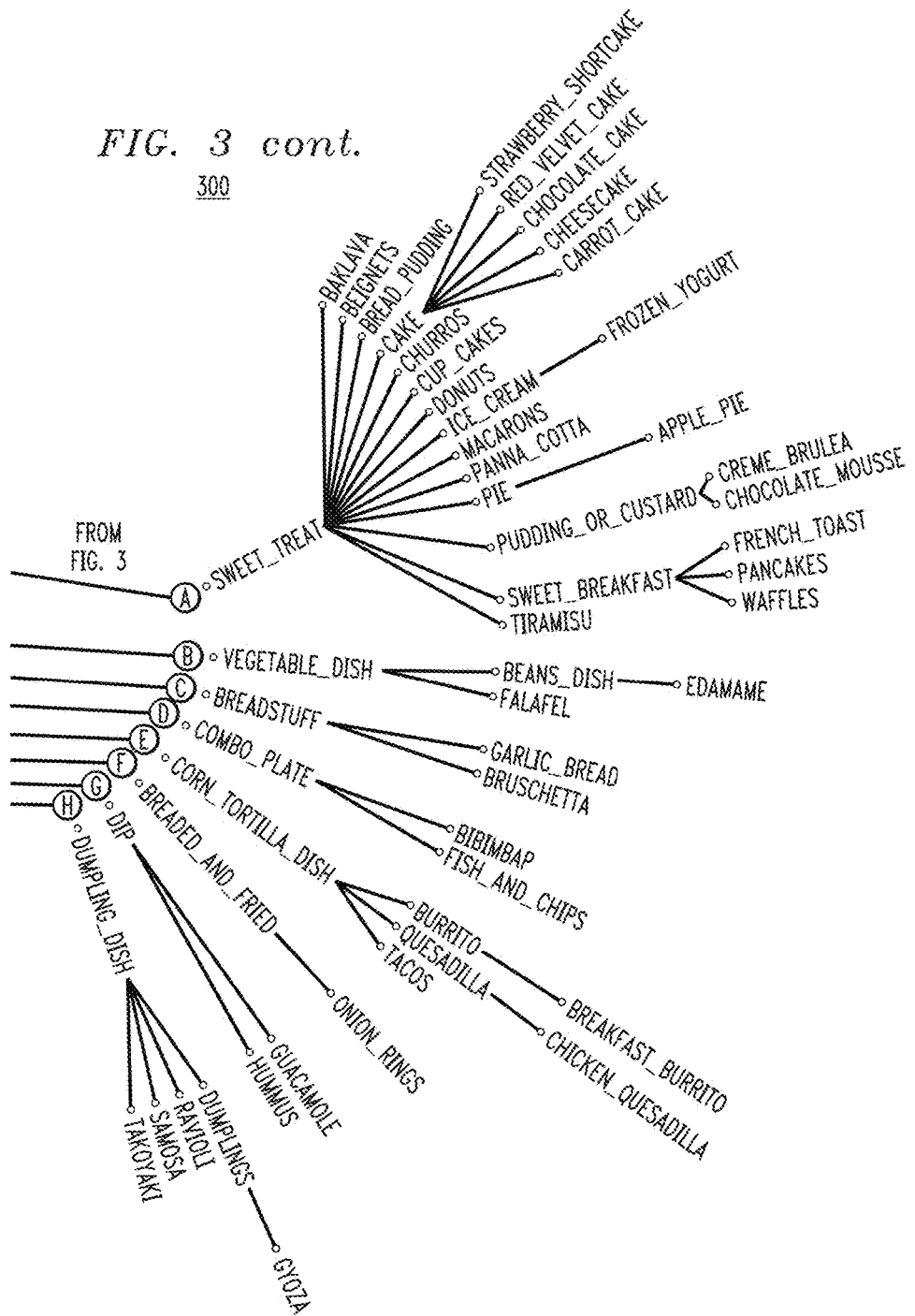

FIG. 3, as mentioned above, shows an example of a food classification hierarchy 300 in the form of a tree. Embodiments, however, are not limited to use with classification hierarchies that are tree structures. Various other types of hierarchies may be utilized, such as relational databases, directed graphs, etc. Hierarchical relationships in a classification hierarchy such as classification hierarchy 300 may be provided manually, learned using natural language processing, obtained from existing resources such as WordNet, etc.

The classification hierarchy 300 is in the form of a tree with a root node of food taxonomy, which is divided into a first subset of classes of food dishes in a first level of the hierarchy (breadstuff, combo plate, corn tortilla dish, breaded and fried, dip, dumpling dish, sandwich or burger, fries dish, meat or poultry dish, pasta or noodles, pizza, rice dish, salad, egg dish, seafood or shellfish, snack food, soup, sweet treat and vegetable dish). Various categories or classes of food dishes in the first level of the hierarchy have subcategories or classes in a second level of the hierarchy.

For example, the second level of the hierarchy includes burger and sandwich which are in the semantic path of the sandwich or burger class in the first level. The burger class and sandwich classes in the second level also include classes in the third level. For example, the hamburger class in the third level is in the semantic path of the sandwich or burger class in the first level and the burger class in the second level. The club sandwich, grilled cheese sandwich, lobster roll sandwich and pulled pork sandwich classes in the third level are in the semantic path of the sandwich or burger class in the first level and the sandwich class in the second level. It should be noted that not all semantic paths include classes in three levels in the classification hierarchy 300. For example, the pizza class in the first level is a leaf node, while the guacamole and hummus classes are leaf nodes in the second level (in the semantic path of the dip class in the first level).

Figure 4:
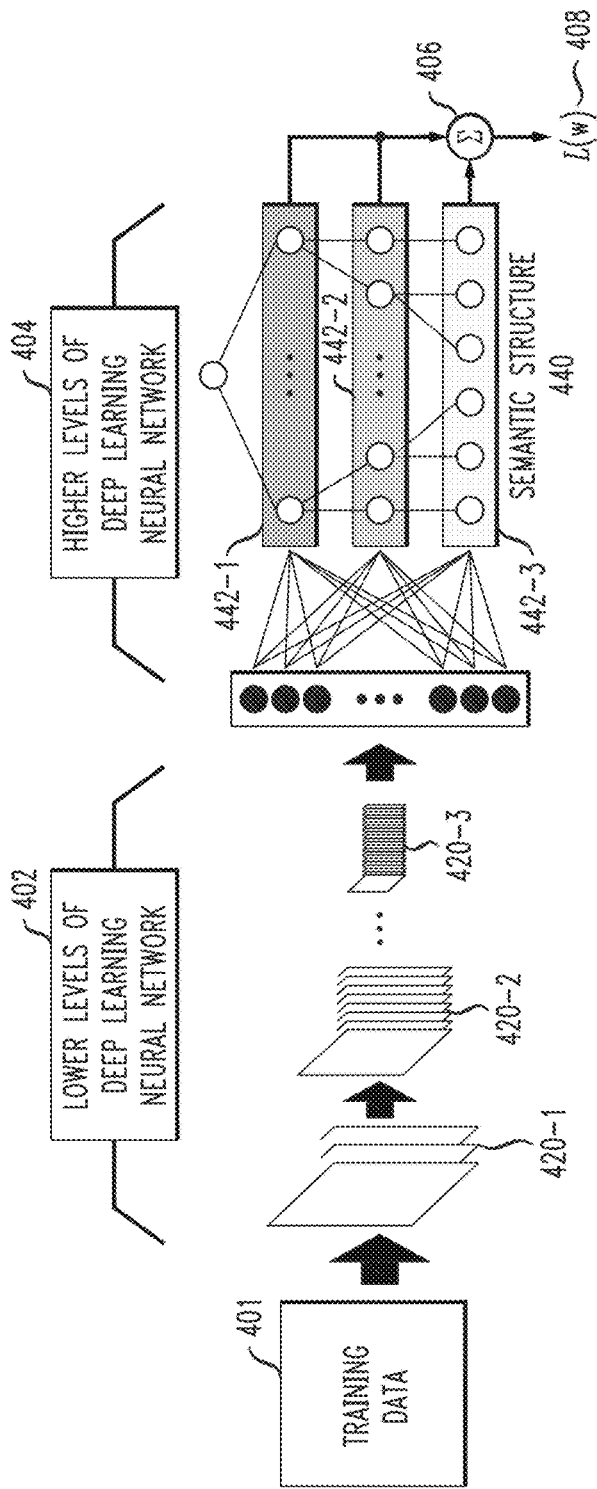
FIG. 4 depicts an example of semantic-aware joint feature learning, according to an embodiment of the present invention.

FIG. 4 shows a process 400 for semantic-aware joint feature learning. As shown, training data 401 is provided to lower levels 402 of a deep learning neural network, such as a CNN. The lower levels of the deep learning neural network include feature sets 420-1, 420-2 and 420-3, collectively referred to herein as feature sets 420. As illustrated by their relative sizes in FIG. 4, the features sets 420 vary in specificity from simple to complex. Feature set 420-1, for example, may include relatively simple visual features such as edges, colors, corner points, etc. Feature sets 420-2 and 420-3 may include more detailed and class discriminative features, such as patterns, textures, distances between specific features, car wheels, dog facts, human body parts, etc.

The feature learning is shared in the process 400 as shown in the higher levels 404 of the deep learning neural network. In this particular example, the semantic structure 440 includes three semantic levels 442-1, 442-2 and 442-3 collectively referred to herein as semantic levels 442. It should be noted that the number of features sets 420 and the number of semantic levels 442 do not have to be the same, this is merely a coincidence in this example process 400. Each of the semantic levels 442 in the semantic structure 440 utilizes joint feature learning from all of the feature sets 420 in the lower levels 402 of the deep learning neural network. For comparison, a flat classifier would utilize only the leaf nodes of semantic structure 440, e.g., the semantic level 442-3.

As shown, the classification results from the different semantic levels 442 are combined 406 for use in the objective function L(w) 408. Each of the semantic levels 442 may correspond to one of the classifiers 106 in semantic-aware classifier 102. The classifiers 106 may thus be viewed as learned classifiers that simultaneously optimize for classification accuracy at each semantic level 442 of the semantic structure 440.

Given N training images, $\{x_i, y_i\}_{i=1}^{N}$, where $x_i$ is the vectorized pixel values of an image and $y_i \in Y$ is the corresponding image label, a softmax loss function used in CNN may be formulated as $$L(w) = \sum_{i=1}^{N} -\log p(y_i | x_i, w) \quad (1)$$

where w is a vector of the network parameters and $p(y_i|x_i, w)$ is the output at the $y_i$-th node in the output layer. While the above formulation applies to general fine-grained classification, it does not explicitly model structures such as semantic relationships among classes.

Let us define a semantic structure $T=\{Y^{(t)}\}_{t=0}^{T}$, where $Y^{(t)}=\{0, 1, \ldots, c^{(t)}\}$ is the set of $c^{(t)}$ labels at the t-th level of the semantic hierarchy. $Y^{(T)}$ is the root node, which represents a generic concept such as "food." The leaf nodes, $Y^{(0)}=Y$, correspond to the original input classes. By leveraging the semantic structure T, high-level CNN features are learned which can improve on fine-grained classification. The following multi-task learning based loss function may be used in some embodiments $$L(w) = \sum_{i=1}^{N} -\log p(y_i^{(0)} | x_i, w_0, w^{(0)}) + \lambda \cdot \sum_{t=1}^{T-1} \sum_{i=1}^{N} -\log p(y_i^{(t)} | x_i, w_0, w^{(t)}) \quad (2)$$

where $y_i^{(t)} \in Y^{(t)}$ is the corresponding class label of image i at the t-th semantic level, $w=[w_0, w^{(1)}, \ldots, w^{(T)}]$, $w_0$ represents the network parameters from the input layer to the high-level feature level, and $w^{(t)}$ corresponds to the parameters of the fully-connected layer that maps from the high-level features to the output layer at the t-th level of the semantic tree. $\lambda$ controls the trade-off between the contribution of the fine-grained classification from the leaf level and the semantic relationships among super categories.

Given a semantic tree, such as the classification hierarchy 300 shown in FIG. 3, equation (2) can jointly optimize the softmax output at each level of the hierarchy, e.g., at each semantic level 442 in semantic structure 440. As illustrated in FIG. 4, the feature learning is shared by the different softmax output layers, or the semantic levels 442 each modeling a different level in the hierarchical tree or semantic structure 440. The joint feature learning design provides a number of advantages, such as ensuring that high-level CNN features for fine-grained classification are also discriminant for super categories and in helping the model to produce more semantically coherent predictions. Thus, even in cases of misclassification, predictions provided by semantic-aware classifier 102 tend to fall within semantically related categories as described above with respect to FIG. 2.

During the learning process, the weights $w_0$ of the shared feature layers may be initialized in a number of ways. For example, the weights $w_0$ may be initialized using values of a pre-trained network. The fully connected layers may be initialized using the uniform distribution. For each fully connected layer, the weight update is only related to its corresponding softmax term; for the previous layers, the gradient can be computed as the weighted sum of the gradient related to each loss term in equation (2). Equation (2) may be optimized using stochastic gradient descent techniques.

Figure 5:
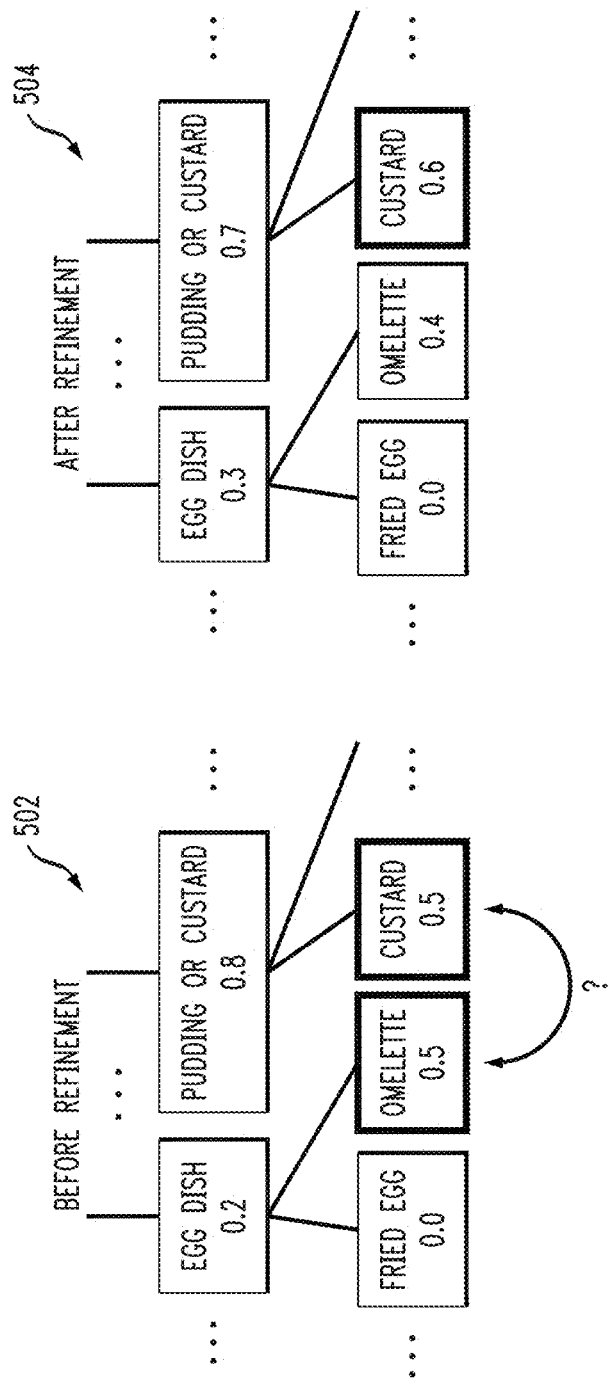
FIG. 5 depicts an example of label inference in a classification hierarchy, according to an embodiment of the present invention.

FIG. 5 depicts an example process 500 for label inference in a classification hierarchy such as classification hierarchy 300. Element 502 shows labels prior to refinement, while element 504 shows labels after refinement. As shown, before refinement there are two classes in the lower level, omelette and custard, with equal weighting of 0.5. To handle this ambiguity and to produce more semantically coherent predictions, the confidence or probabilities from a higher level of the semantic hierarchy can be propagated down to the lower level. Thus, the labels or probability scores estimated from the classifiers 106 of semantic-aware classifier 102 may be refined and improved by inference on the classification hierarchy 300. Difficult recognition cases at the leaf nodes in the lower level, such as the case wherein omelette and custard have the same score of 0.5, may be disambiguated by aggregating information from parent nodes in the hierarchy.

It should be noted that difficult recognition cases are not limited to those wherein leaf nodes have the same score, but may instead more generally refer to cases wherein leaf nodes have scores within a designated threshold of one another. After refinement, the difficult recognition between omelette and custard is disambiguated by adjusting the labels or probability scores of the leaf nodes as well as the parent nodes. Viewing the parent nodes, it is seen that the more likely recognition result (given an input set of visual features) is in the category of pudding or custard, and thus the score for custard is increased while the score for omelette is decreased. At the same time, the relative weightings of parent nodes egg dish and pudding or custard are adjusted to narrow the difference between their respective score for the given input set of visual features.

Difficult recognition cases may also occur in part when parent nodes have scores that are within a designated threshold of one another (which may or may not be the same as the designated threshold used for defining difficult recognition among leaf nodes). In such cases, information from the leaf nodes may be aggregated so as to disambiguate the parent nodes in a manner similar to that described above with respect to disambiguating the leaf nodes in the FIG. 6 example.

Let $p=[h^{(0)T}, h^{(1)T}, \ldots, h^{(T-1)T}]^T$ be the probability outputs at each semantic level of the learned CNN. The semantic relationships of the classification hierarchy may be further incorporated by inferencing the probability values on the semantic tree. The label inference problem in some embodiments is formulated as a random walk process. Initial probability scores are considered as initial values on each node, and each node takes random transitions to its parent or child in the semantic graph at each step until the node values converge. The goal is to incorporate the recognition results from super categories as well as from the leaf nodes so that in difficult recognition cases, information at different semantic levels are considered simultaneously.

FIG. 5, as discussed above, shows an example 500 of such a process. Initial CNN predictions, i.e., the numeric values in each box, might present errors or confusion such as the leaf nodes omelette and custard having the same 0.5 score. The random walk process enforces consistency by smoothing the prediction values over classes on the same semantic path. It thus drives the score of custard (the correct prediction) to a larger value of 0.6 based on the large initial prediction of its parent node pudding or custard.

Let $A_{n \times n}$ be the adjacency matrix defined over all the tree nodes $V=\{Y^{(0)}, Y^{(1)}, \ldots, Y^{(T)}\}$ where $|V|=\Sigma_{t=0}^{T} c^{(t)}$ is the total number of tree nodes. $A_{i,j}=1$ when i-th node in V is the parent or a child of the j-th node, otherwise $A_{i,j}=0$. Given the adjacency matrix, a transitional probability matrix T is constructed by normalizing each column of A to have unit L1 norm. At the k-th step of the random walk process, the current node values are determined by both the initial input values, $p_0$ (normalized to have unit L1 norm), and the previous values on each node $$p^{(k)} = \alpha \cdot p^{(0)} + (1-\alpha) \cdot T^T p^{(k-1)} \quad (3)$$

where $\alpha$ is a trade-off parameter between preserving input values and semantic based label inference. Using the constraint of unit L1 norm of $p^{(k)}$, equation (3) becomes $$p^{(k)} = \alpha \cdot p^{(0)} 1^T p^{(k-1)} + (1-\alpha) \cdot T^T p^{(k-1)} \quad (4)$$

$$= T'^T p^{(k-1)}$$

where $T'^T = \alpha \cdot p^{(0)} 1^T + (1-\alpha) \cdot T^T$. The final node values are taken as the stationary value of $p^{(k)}$ as $k \to \infty$. It is readily seen that the stationary node values are proportional to the eigenvector (corresponding to the largest eigenvalue) of $T'^T$. To calculate the stationary node values, p*, the Power Method may be used by continually multiplying T' to the node values until convergence. In each iteration, L1 normalization is applied to $p^{(k)}$. The final prediction for an input image is obtained by taking the label with the largest value on the sub-vector in p* corresponding to the leaf nodes.

Figure 6:
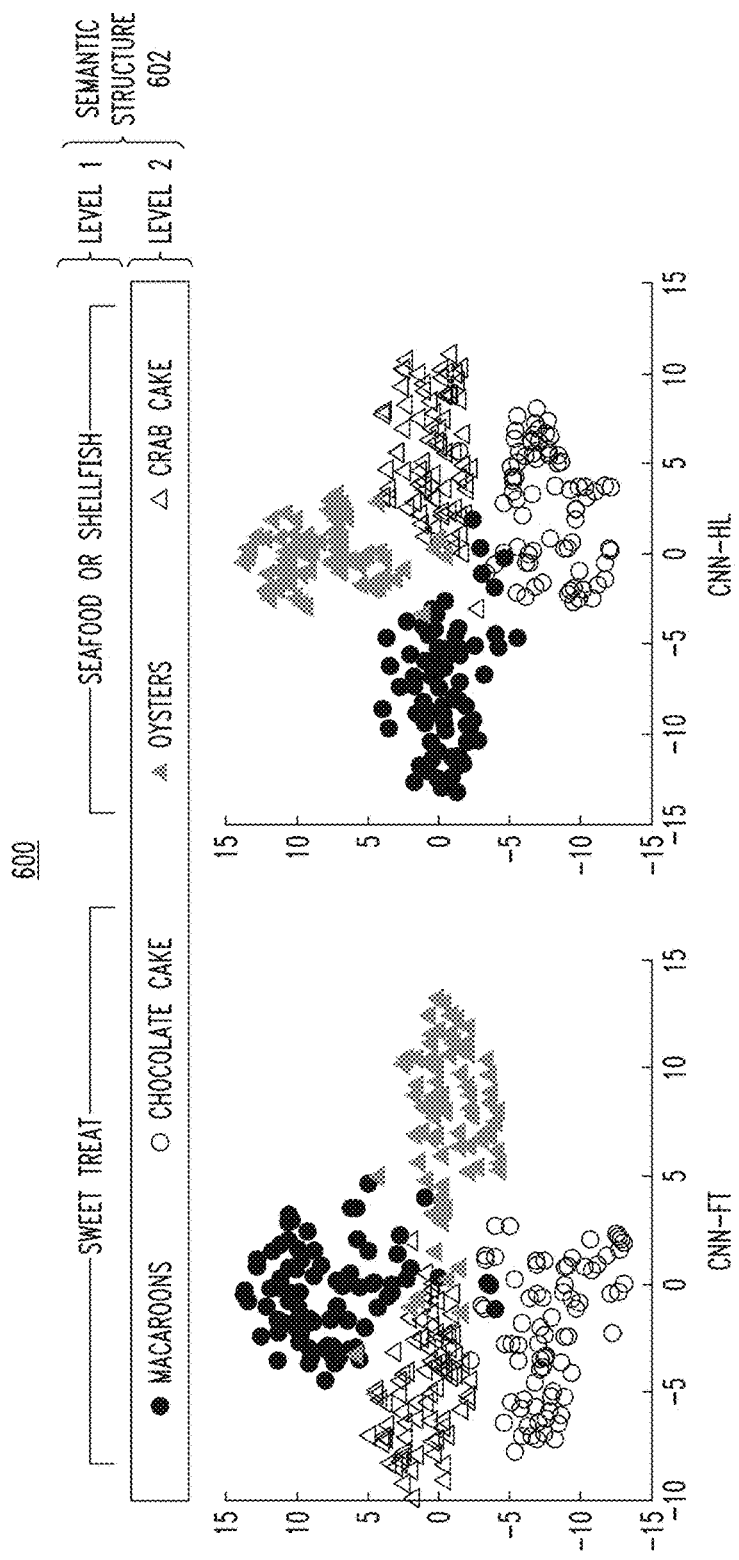
FIG. 6 depicts a plot comparing separation of classification probabilities with and without semantic-aware image classification, according to an embodiment of the present invention.

Classification performance using semantic-aware techniques described herein is illustrated in FIG. 6. Two datasets were used in evaluating classification performance, Food-101 and 5-Chain. Food-101 is a benchmark food dataset commonly used to evaluate food classification accuracy, while 5-Chain contains menu items from five popular restaurant chains in the United States (Applebee's®, Denny's®, the Olive Garden®, Panera Bread® and TGI Fridays®). The images were collected from multiple web sources, such as search engines (e.g, Bing® and Google®) and social networks (e.g., Flickr®, Foodspotting®, Yelp®) and manually labeled. Food-101 has 101 classes and 1000 images per class. 5-Chain has an average of 50 classes (for each restaurant chain) with 10 images per class. The categories or classes in the 5-Chain dataset contain relatively few images compared to Food-101 since the classes are more specific. Food-101 contains more generic food classes with various composition styles, whereas 5-Chain food items have more standard food composition and less intra-class variance. For example, the class hummus in the Food-101 dataset may include more varying types of images of hummus, whereas the class for a particular dish offered from a restaurant chain will have more uniform types of images.

For the Food-101 dataset, a 101-way classifier framework was trained and for the 5-Chain dataset a separate classifier framework was trained for each restaurant independently. A generic food taxonomy, the classification hierarchy 400, was constructed. For each classification task, the subset of the taxonomy that covers the corresponding food classes was taken into account. For experimentation, 75% of the images were randomly selected for training and the rest were used for testing. GoogLeNet was used as the base neural network for the proposed hierarchical food recognition approach. Embodiments, however, are not limited to use with GoogLeNet—the semantic-aware classification framework described herein is independent of the base architecture on top of which it is applied, and may be combined with any CNN or other deep learning neural network architecture or more generally any machine learning algorithm or architecture.

For comparison, the performance of semantic-aware classification frameworks is compared to a baseline model consisting of a pre-trained GoogLeNet fine-tuned for each dataset. This baseline model is also referred to herein as CNN-FT. The semantic-aware classification framework that utilizes the multi-task hierarchical loss function is referred to as CNN-HL, and the semantic-aware classification framework that utilizes the multi-task hierarchical loss function with the addition of label inference is referred to as CNN-HL-LI.

The algorithms were implemented using the Lasagne library and experiments were performed on a cluster with ~20 NVIDIA® K40 graphics processor units (GPUs). In the experiments, $\lambda=1$ and $\alpha=0.2$ values were used. Embodiments, however, are not limited solely to use with these values for $\lambda$ and $\alpha$. The random walk process was considered to reach convergence when the L1 norm of the node values changed by less than 0.001. In the experiments, convergence was typically achieved within 10 iterations. Embodiments, however, may use different measures for convergence and/or different numbers of iterations in the random walk process as desired.

Table 1 below summarizes the top-1 classification accuracy using CNN-FT, CNN-HL and CNN-HL-LI for the Food-101 and 5-Chain datasets:

TABLE 1

| | | CNN-FT | | CNN-HL | | CNN-HL-LI | |
|---|---|---|---|---|---|---|---|
| | Dataset | Accuracy | LCA | Accuracy | LCA | Accuracy | LCA |
| | Food-101 | 69.64 | 0.80 | 72.09 | 0.72 | 72.11 | 0.72 |
| 5-Chain | Applebee's ® | 72.55 | 0.93 | 74.18 | 0.85 | 73.91 | 0.86 |
| | Denny's ® | 57.75 | 1.31 | 59.68 | 1.27 | 60.00 | 1.26 |
| | The Olive Garden ® | 78.10 | 0.77 | 79.52 | 0.72 | 80.95 | 0.66 |
| | Panera Bread ® | 91.03 | 0.27 | 90.98 | 0.26 | 91.19 | 0.25 |
| | TGI Fridays ® | 73.48 | 0.82 | 77.27 | 0.68 | 77.78 | 0.66 |

Except on the Panera Bread® experiment, CNN-FT produced lower classification performance than CNN-HL, thus demonstrating that the proposed joint feature learning strategy improves upon classification accuracy with only softmax loss at the leaf semantic layer. Further, CNN-HL-LI ranks higher than CNN-FT and CNN-HL on all datasets with the exception of Applebee's® thus demonstrating the effectiveness of the explicit usage of the semantics in label refinement.

In addition to directly evaluating classification accuracy, it is useful to consider the consistency of the recognition result within the provided semantic structure. As described above, in certain contexts it is preferable to make "better" mistakes. The learned features are visualized by taking the output of the high level feature layers of the learned CNN and projecting them to a 2D space. FIG. 6 shows a plot 600, illustrating that the two super categories, Sweet treat and Seafood or shellfish in Level 1 of the semantic structure 602, are better separated with the learned CNN using the proposed multi-task loss function in CNN-HL relative to CNN-FT. This demonstrates that the joint feature learning process enables learning features that can discriminate classes at different levels of the semantic structure 602. As shown, the super categories in Level 1 may be used to separate more fine-grained categories of macaroons, chocolate cake, oysters and crab cake in Level 2 of the semantic structure 602.

This property can provide various benefits. For example, in cases of misclassification in a nutrition estimation application, semantically close predictions provide more relevant nutrition estimation than entirely unrelated predictions.

To quantitatively evaluate whether the learned model is consistent with the semantics, the semantic distance between the ground truth label and the predicted label is measured using the height of Lowest Common Ancestor (LCA), where 0 indicates a correct or exact match and 2 means that two nodes share a common grandparent. The mean LCA on each dataset is calculated and shown in Table 1. The results show that CNN-FT achieves the lowest performance and CNN-HL-LI outperforms CNN-HL for most datasets. Similar observations can be made from the qualitative results discussed above in the context of FIG. 2. The results show that in misclassification cases, CNN-HL-LI provides recognition results that are semantically closer to the ground truth. It is important to note that the results shown in Table 1 and the plot 600 are presented by way of example, and that embodiments are not limited to food recognition or to recognition specifically of food dishes from any of the datasets described.

The semantic-aware classification techniques may be used in any visual recognition system in which it is desirable to provide improved classification accuracy or to provide more semantically consistent results in misclassification. Various embodiments are described above in the context of a food recognition. Food recognition may itself be used in a number of application areas, such as in food intake tracking applications. In such an application, a mobile device may be used to take pictures of food dishes. Classification results from such pictures may be used in meal consumption logging, senior care services, weight loss systems, etc. Classification results of food pictures or images may also be used in generating shopping lists or to match images to recipes. For example, a user may wish to take a picture of a food dish on a mobile device and use classification results to identify a recipe for the food dish, to generate a shopping list for the ingredients used in the food dish, etc. While described above in the context of a mobile device capturing the images to be classified, input images may be obtained from any source such as from a web search, social network feed, etc.

Embodiments are not limited to food recognition. For example, features of the embodiments described above in the context of food recognition systems may be applicable more generally in automatic product search and ordering systems. Consider, by way of example, a user that takes a picture of a part or product. The image may be classified to identify the part or product to facilitate purchase or ordering of the product, troubleshooting or other support for the product, etc. Visual recognition in the fields of human robot integration and industrial part recognition are other non-limiting examples of possible application domains which may benefit from the use of the semantic-aware classification techniques described herein.

Figure 7:
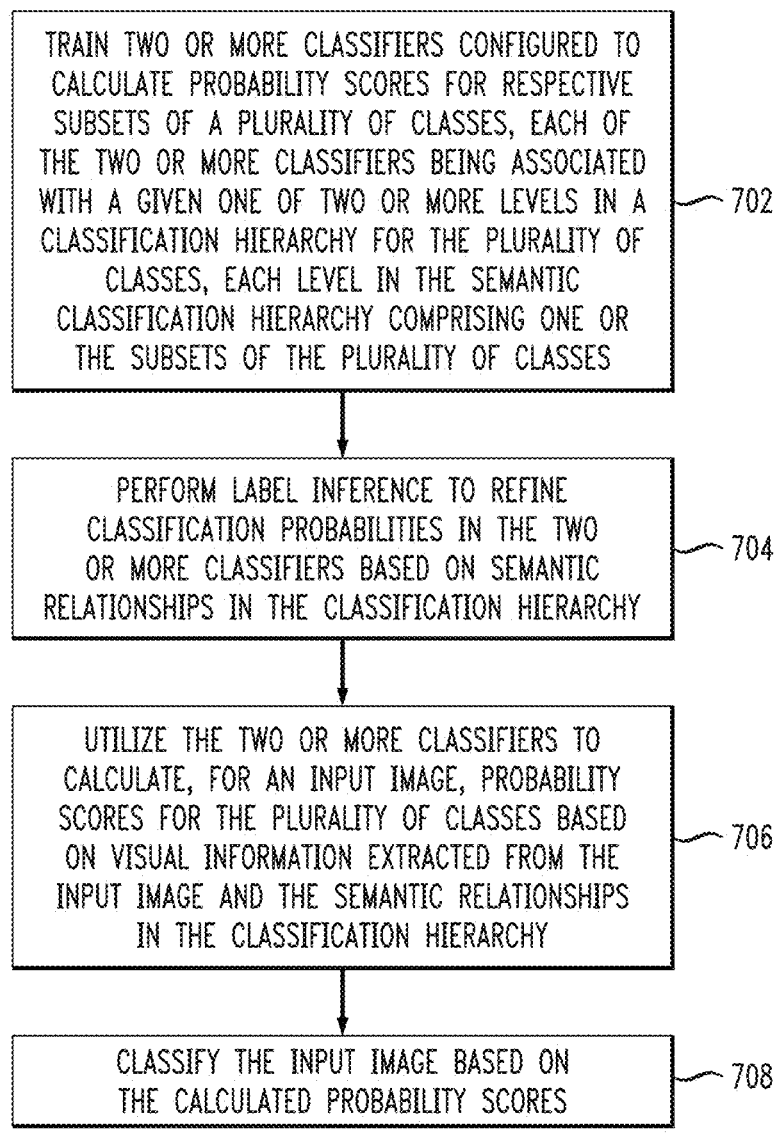
FIG. 7 depicts a process for semantic-aware image classification, according to an embodiment of the invention.

FIG. 7 depicts a process 700 for semantic-aware image classification. The process 700 may be performed using semantic-aware classifier 102. In step 702, two or more classifiers, such as classifiers 106 that are configured to calculated probability scores for respective subsets of a plurality of classes, are trained. Each of the classifiers 106 is associated with a given one of two or more levels in a classification hierarchy for the plurality of classes, and each level in the semantic classification hierarchy comprises one of the subsets of the plurality of classes.

The process 700 continues with step 704, performing label inference to refine classification probabilities in the classifiers 106 based on semantic relationships in the classification hierarchy. In step 706, the classifiers 106 are utilized to calculate, for an input image, probability scores for the plurality of classes based on visual information extracted from the input image and the semantic relationships in the classification hierarchy. The process 700 concludes with step 708, classifying the input image based on the calculated probability scores.

Training the classifiers 106 in step 702 may utilize one or more machine learning algorithms or networks, such as deep learning neural networks or CNNs. The deep learning neural network may comprise a first set of levels for different feature sets and a second set of levels corresponding to the two or more levels in the classification hierarchy. Utilizing the classifiers 106 to calculate the probability scores in step 706 may include using an objective function combining recognition results for the second set of levels in the deep learning neural network. The classifiers 106 may share feature representation based on the first set of levels in the deep learning neural network.

In some embodiments, step 702 includes utilizing a multi-task learning based loss function that jointly optimizes classifiers associated with each of the two or more levels in the classification hierarchy. The multi-task learning based loss function may utilize a tradeoff parameter that adjusts contributions of fine-grained classifications from a lowest level of the classification hierarchy with semantic relationships among classes at one or more higher levels of the classification hierarchy. The multi-task learning based loss function trains the classifiers 106 such that misclassification of the input image based on the calculated probability scores falls within a semantically-related category of classes for a correct classification of the input image.

Step 704 may utilize a random walk process that smooths classification probabilities over two or more classes in a same semantic path in the classification hierarchy. The classification hierarchy used in process 700 may comprise a tree structure. In the tree structure, leaf nodes may form a lowest level of the classification hierarchy. Performing label inference in step 704 to refine the classification probabilities in classifiers 106 may include, for two or more leaf nodes having classification probabilities within a designated threshold from one another, adjusting the classification probabilities for the two or more leaf nodes based on classification probabilities for parent nodes in a higher level of the classification hierarchy corresponding to the two or more leaf nodes. Performing label inference in step 704 to refine the classification probabilities in classifiers 106 may also or alternatively include, for two or more parent nodes in a higher level of the classification hierarchy having classification probabilities within a designated threshold from one another, adjusting the classification probabilities for the two or more parent nodes based on the classification probabilities for the leaf nodes corresponding to the two or more parent nodes.

In some embodiments, step 704 includes taking as input a graph structure having initial values for nodes corresponding to classification probabilities in the two or more classifiers and outputting the graph structure with modified values for the nodes.

The hierarchical relationships among the plurality of classes in the classification hierarchy used in process 700 may be obtained from a semantic data store or database such as semantic data store 104, may be learned using natural language processing, may be manually labeled, etc.

In some embodiments, the process 700 may be performed by a mobile device that implements semantic-aware classifier 102. The mobile device may be configured to capture the input image using a camera thereof or from another source such as a web search, social media network, etc. The classification of the input image is used by the mobile device to obtain additional information related to the input image. The additional information may be utilized to take one or more actions in one or more applications running on the mobile device, or to trigger one or more application programming interfaces (APIs) or other features of functions of such applications. The input image, for example, may comprise a food dish and the additional information comprises nutritional information relating to the food dish. The additional information may be used for fitness tracking, meal planning, consumption tracking, etc. As another example, the input image may comprise a product and the additional information may comprise information relating to ordering information for the product. The additional information may be used to place an order for that product, to conduct a web search for the product, to initiate troubleshooting or support for the product, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
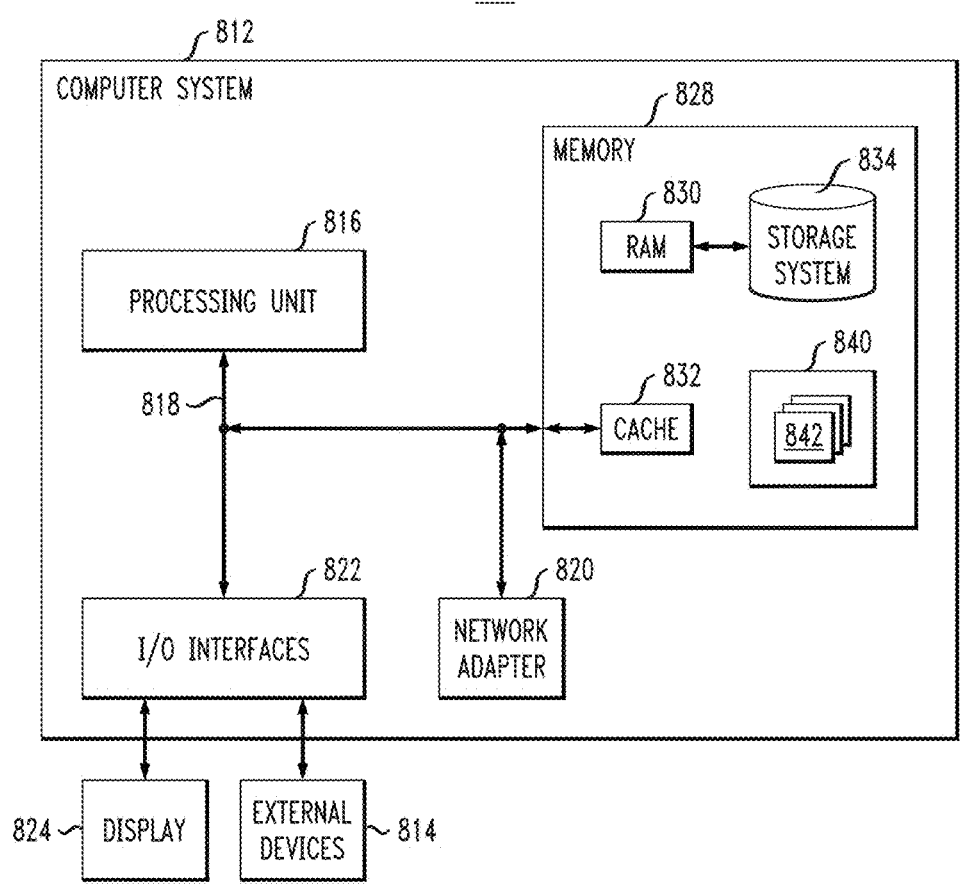
FIG. 8 depicts a computer system in accordance with which one or more components/steps of techniques of the invention may be implemented, according to an embodiment of the invention.

One or more embodiments can make use of software running on a general-purpose computer or workstation. With reference to FIG. 8, in a computing node 810 there is a computer system/server 812, which is operational with numerous other general purpose or special purpose computing system environments or configurations. Examples of well-known computing systems, environments, and/or configurations that may be suitable for use with computer system/server 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 812 may be described in the general context of computer system executable instructions, such as program modules, being executed by a computer system. Generally, program modules may include routines, programs, objects, components, logic, data structures, and so on that perform particular tasks or implement particular abstract data types. Computer system/server 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 812 in computing node 810 is shown in the form of a general-purpose computing device. The components of computer system/server 812 may include, but are not limited to, one or more processors or processing units 816, a system memory 828, and a bus 818 that couples various system components including system memory 828 to processor 816.

The bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 812 typically includes a variety of computer system readable media. Such media may be any available media that is accessible by computer system/server 812, and it includes both volatile and non-volatile media, removable and non-removable media.

The system memory 828 can include computer system readable media in the form of volatile memory, such as random access memory (RAM) 830 and/or cache memory 832. The computer system/server 812 may further include other removable/non-removable, volatile/nonvolatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 818 by one or more data media interfaces. As depicted and described herein, the memory 828 may include at least one program product having a set (e.g., at least one) of program modules that are configured to carry out the functions of embodiments of the invention. A program/utility 840, having a set (at least one) of program modules 842, may be stored in memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system/server 812 may also communicate with one or more external devices 814 such as a keyboard, a pointing device, a display 824, etc., one or more devices that enable a user to interact with computer system/server 812, and/or any devices (e.g., network card, modem, etc.) that enable computer system/server 812 to communicate with one or more other computing devices. Such communication can occur via I/O interfaces 822. Still yet, computer system/server 812 can communicate with one or more networks such as a LAN, a general WAN, and/or a public network (e.g., the Internet) via network adapter 820. As depicted, network adapter 820 communicates with the other components of computer system/server 812 via bus 818. It should be understood that although not shown, other hardware and/or software components could be used in conjunction with computer system/server 812. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
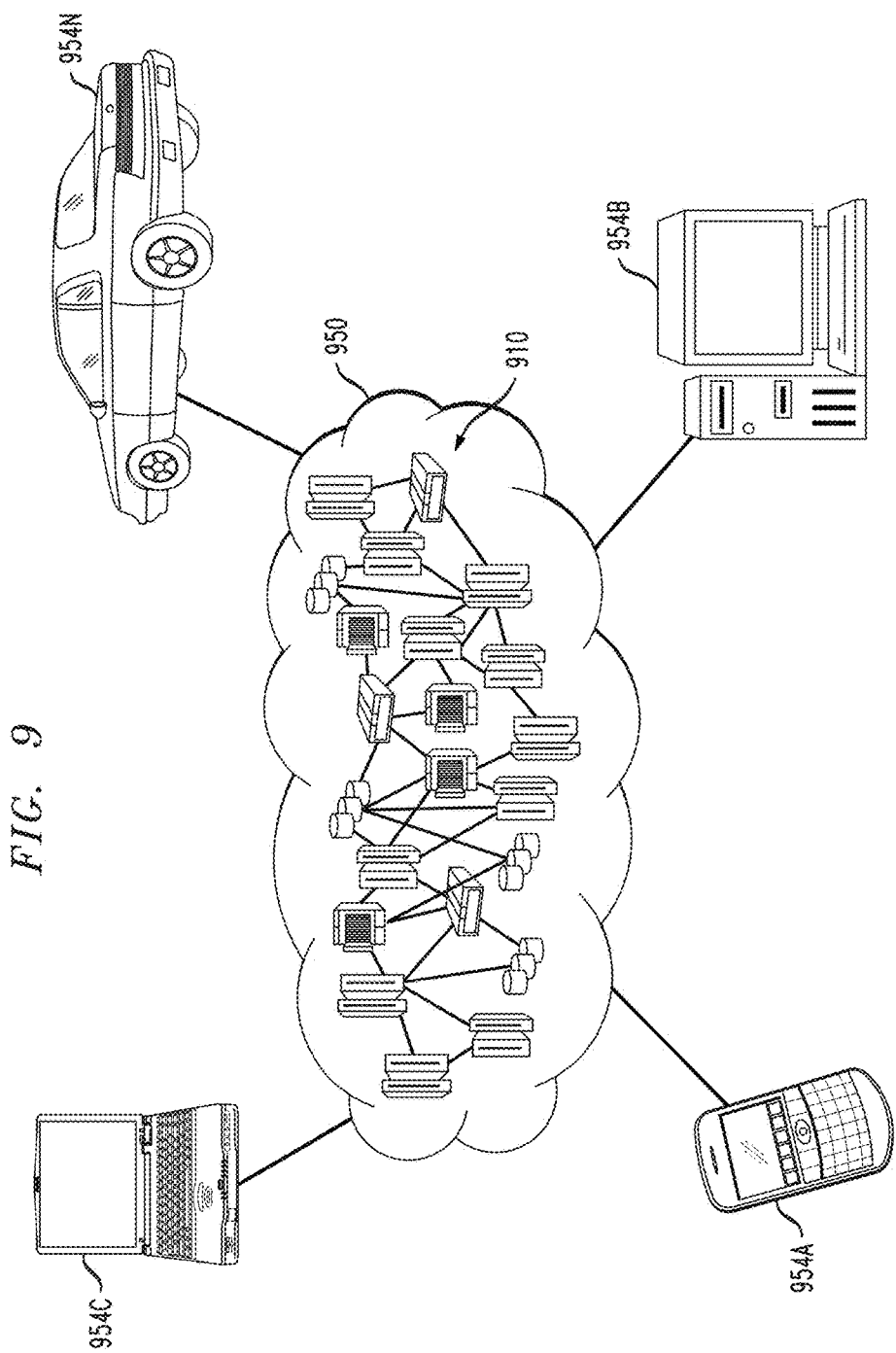
FIG. 9 depicts a cloud computing environment, according to an embodiment of the present invention.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
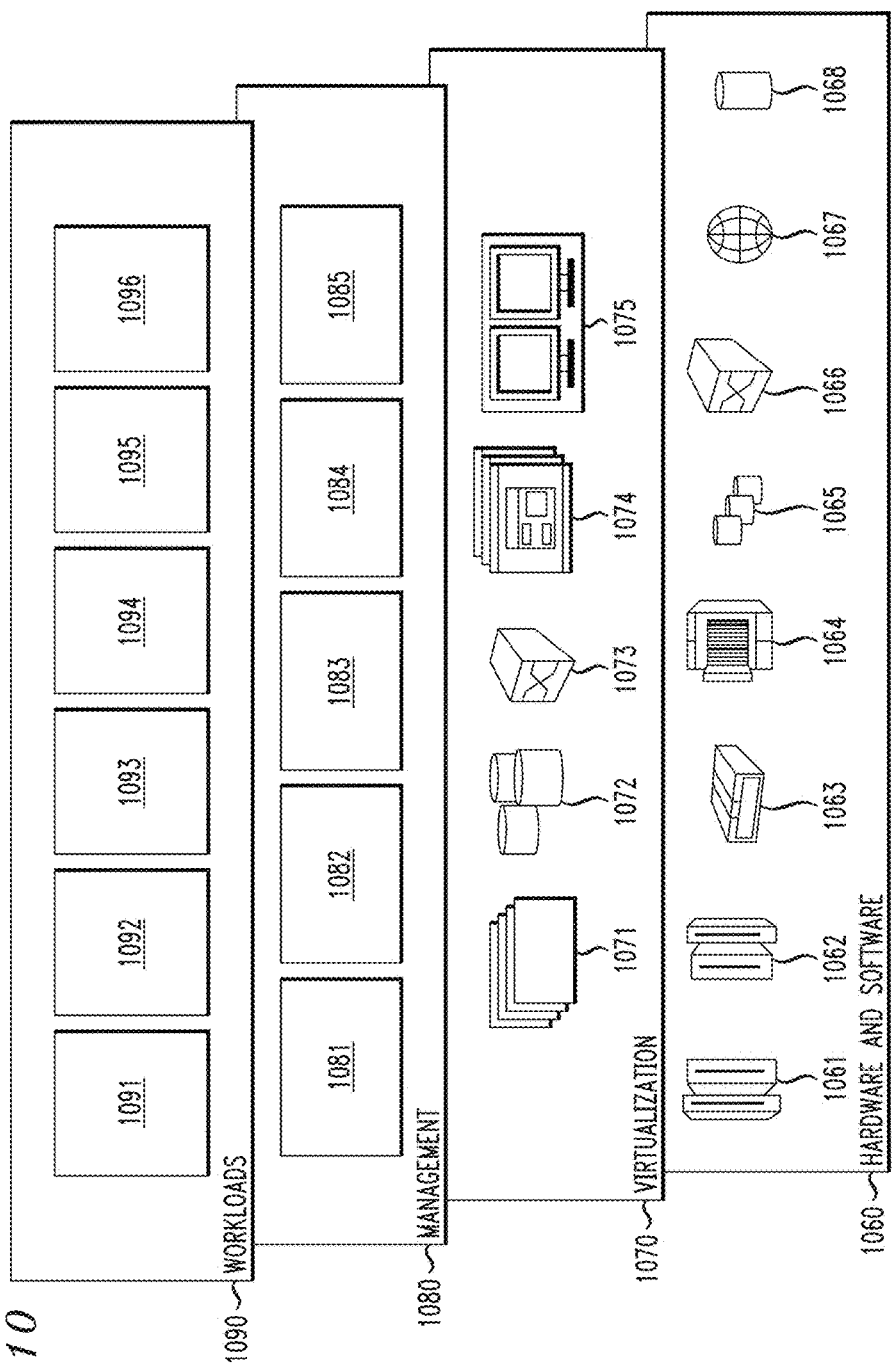
FIG. 10 depicts abstraction model layers, according to an embodiment of the present invention.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and semantic-aware classification 1096, which may perform one or more functions of semantic-aware classifier 102.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    utilizing two or more classifiers to calculate, for an input image, probability scores for a plurality of classes based on visual information extracted from the input image and semantic relationships in a classification hierarchy, wherein each of the two or more classifiers is associated with a given one of two or more levels in the classification hierarchy with each level in the classification hierarchy comprising a subset of the plurality of classes;
    classifying the input image based on the calculated probability scores;
    training the two or more classifiers to calculate probability scores for respective subset of the plurality of classes; and
    performing label inference to refine classification probabilities in the two or more classifiers based on semantic relationships in the classification hierarchy;
    wherein training the two or more classifiers and performing label inference comprises at least one of:
        taking as input a graph structure having initial values for nodes corresponding to classification probabilities in the two or more classifier and outputting the graph structure with modified values for the nodes;
        utilizing a multi-task learning based loss function that jointly optimizes classifiers associated with each of the two or more levels in the classification hierarchy; and
        utilizing a random walk process that smooths classification probabilities over two or more classes in a same semantic path in the classification hierarchy.

2. The method of claim 1, wherein training the two or more classifiers utilizes a deep learning neural network.

3. The method of claim 1, wherein the classification hierarchy comprises a tree structure and performing label inference to refine the classification probabilities in the two or more classifiers comprises, for two or more leaf nodes having classification probabilities within a designated threshold from one another, adjusting the classification probabilities for the two or more leaf nodes based on classification probabilities for parent nodes in a higher level of the classification hierarchy relative to the two or more leaf nodes.

4. The method of claim 1, wherein the classification hierarchy comprises a tree structure and performing label inference to refine the classification probabilities in the two or more classifiers comprises, for two or more parent nodes having classification probabilities within a designated threshold from one another, adjusting the classification probabilities for the two or more parent nodes based on the classification probabilities for two or more leaf nodes corresponding to the two or more parent nodes, wherein the two or more parent nodes are in a higher level of the classification hierarchy relative to the two or more leaf nodes.

5. The method of claim 1, wherein the multi-task learning based loss function utilizes a tradeoff parameter that adjusts contributions of fine-grained classifications from a lowest level of the classification hierarchy with semantic relationships among classes at one or more higher levels of the classification hierarchy.

6. The method of claim 1, wherein the multi-task learning based loss function trains the two or more classifiers such that misclassification of the input image based on the calculated probability scores falls within a semantically-related category of classes for a correct classification of the input image.

7. The method of claim 1, wherein hierarchical relationships among the plurality of classes in the classification hierarchy are at least one of:
    obtained from a semantic data store; and
    learned using natural language processing.

8. The method of claim 1, further comprising:
    capturing the input image using a mobile device; and
    utilizing the classification of the input image to obtain additional information related to the input image.

9. The method of claim 8, wherein at least one of:
    the input image comprises a food dish and the additional information comprises nutritional information relating to the food dish; and
    the input image comprises a product and the additional information comprises information relating to ordering information for the product.

10. The method of claim 1, wherein the two or more classifiers are provided as software-as-a-service in a cloud environment.

11. The method of claim 1, wherein the two or more classifiers are provided as an on-demand self-service in a cloud environment.

12. A computer program product comprising a computer readable storage medium for storing computer readable program code which, when executed, causes a computer:
    to utilize two or more classifiers to calculate, for an input image, probability scores for a plurality of classes based on visual information extracted from the input image and semantic relationships in a classification hierarchy, wherein each of the two or more classifiers is associated with a given one of two or more levels in the classification hierarchy with each level in the classification hierarchy comprising a subset of the plurality of classes;

to classify the input image based on the calculated probability scores;
to train the two or more classifiers to calculate probability scores for respective subset of the plurality of classes; and
to perform label inference to refine classification probabilities in the two or more classifiers based on semantic relationships in the classification hierarchy;
wherein training the two or more classifiers and performing label inference comprises at least one of:
taking as input a graph structure having initial values for nodes corresponding to classification probabilities in the two or more classifier and outputting the graph structure with modified values for the nodes;
utilizing a multi-task learning based loss function that jointly optimizes classifiers associated with each of the two or more levels in the classification hierarchy; and
utilizing a random walk process that smooths classification probabilities over two or more classes in a same semantic path in the classification hierarchy.

13. An apparatus comprising:
a memory; and
a processor coupled to the memory and configured:
to utilize two or more classifiers to calculate, for an input image, probability scores for a plurality of classes based on visual information extracted from the input image and semantic relationships in a classification hierarchy, wherein each of the two or more classifiers is associated with a given one of two or more levels in the classification hierarchy with each level in the classification hierarchy comprising a subset of the plurality of classes;
to classify the input image based on the calculated probability scores;
to train the two or more classifiers to calculate probability scores for respective subset of the plurality of classes; and
to perform label inference to refine classification probabilities in the two or more classifiers based on semantic relationships in the classification hierarchy;
wherein training the two or more classifiers and performing label inference comprises at least one of:
taking as input a graph structure having initial values for nodes corresponding to classification probabilities in the two or more classifier and outputting the graph structure with modified values for the nodes;
utilizing a multi-task learning based loss function that jointly optimizes classifiers associated with each of the two or more levels in the classification hierarchy; and
utilizing a random walk process that smooths classification probabilities over two or more classes in a same semantic path in the classification hierarchy.

14. The computer program product of claim 12, wherein the multi-task learning based loss function utilizes a tradeoff parameter that adjusts contributions of fine-grained classifications from a lowest level of the classification hierarchy with semantic relationships among classes at one or more higher levels of the classification hierarchy.

15. The computer program product of claim 12, wherein the multi-task learning based loss function trains the two or more classifiers such that misclassification of the input image based on the calculated probability scores falls within a semantically-related category of classes for a correct classification of the input image.

16. The computer program product of claim 12, wherein the classification hierarchy comprises a tree structure and performing label inference to refine the classification probabilities in the two or more classifiers comprises, for two or more leaf nodes having classification probabilities within a designated threshold from one another, adjusting the classification probabilities for the two or more leaf nodes based on classification probabilities for parent nodes in a higher level of the classification hierarchy relative to the two or more leaf nodes.

17. The computer program product of claim 12, wherein the classification hierarchy comprises a tree structure and performing label inference to refine the classification probabilities in the two or more classifiers comprises, for two or more parent nodes having classification probabilities within a designated threshold from one another, adjusting the classification probabilities for the two or more parent nodes based on the classification probabilities for two or more leaf nodes corresponding to the two or more parent nodes, wherein the two or more parent nodes are in a higher level of the classification hierarchy relative to the two or more leaf nodes.

18. The apparatus of claim 13, wherein the multi-task learning based loss function utilizes a tradeoff parameter that adjusts contributions of fine-grained classifications from a lowest level of the classification hierarchy with semantic relationships among classes at one or more higher levels of the classification hierarchy.

19. The apparatus of claim 13, wherein the multi-task learning based loss function trains the two or more classifiers such that misclassification of the input image based on the calculated probability scores falls within a semantically-related category of classes for a correct classification of the input image.

20. The apparatus of claim 13, wherein the classification hierarchy comprises a tree structure and performing label inference to refine the classification probabilities in the two or more classifiers comprises for two or more leaf nodes having classification probabilities within a designated threshold from one another, adjusting the classification probabilities for the two or more leaf nodes based on classification probabilities for parent nodes in a higher level of the classification hierarchy relative to the two or more leaf nodes.

* * * * *